April 8, 1941.  F. O. CHURCH  2,237,475
SEAT CUSHION
Filed Oct. 18, 1939   2 Sheets-Sheet 1
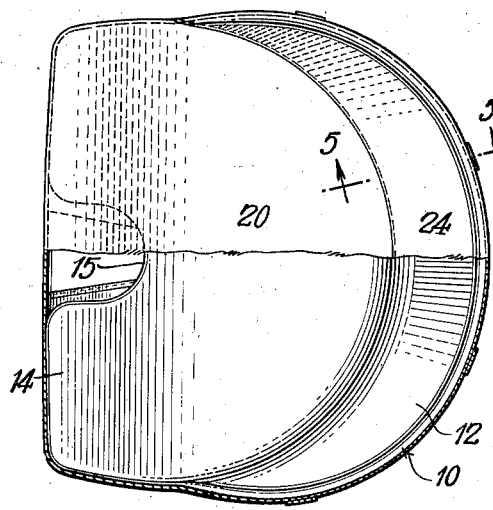
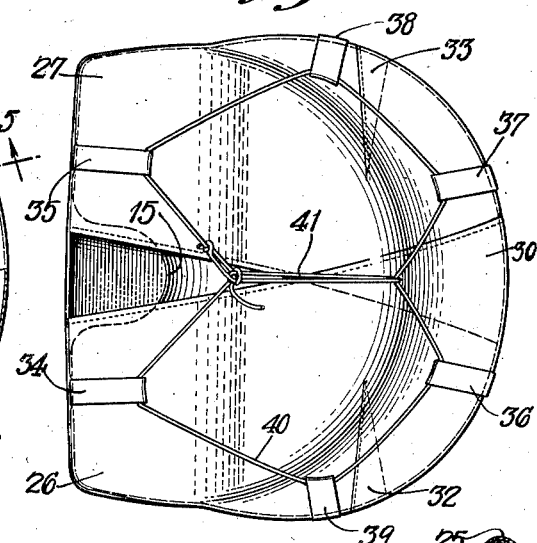
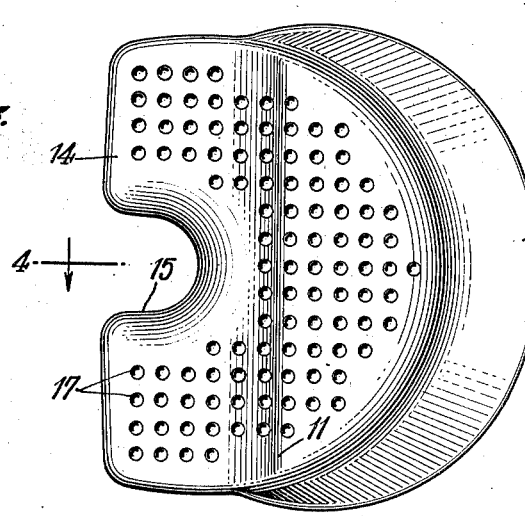
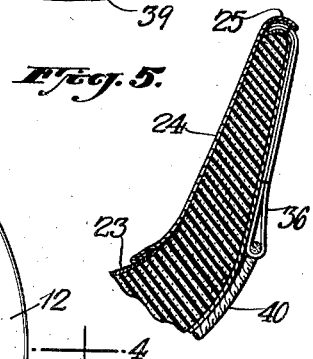
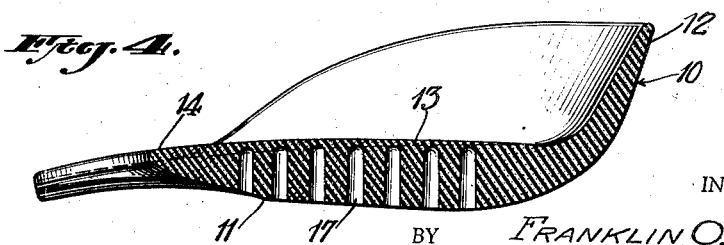
INVENTOR.
BY  FRANKLIN O. CHURCH.
Benj. T. Rauber ATTORNEY.

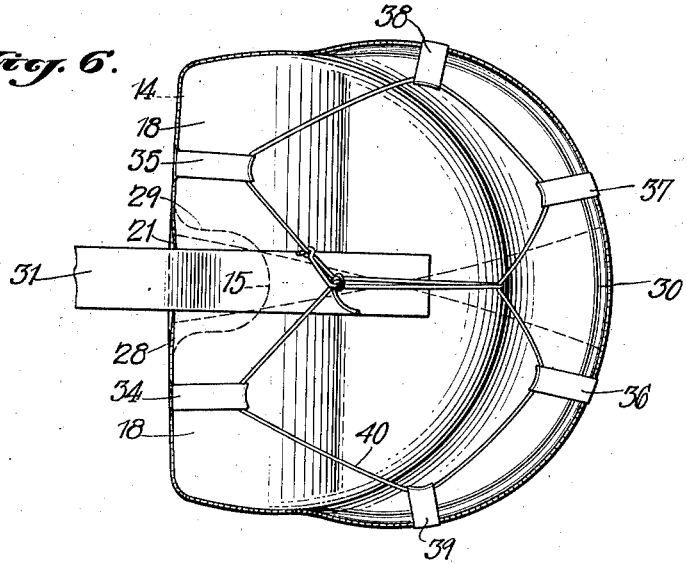
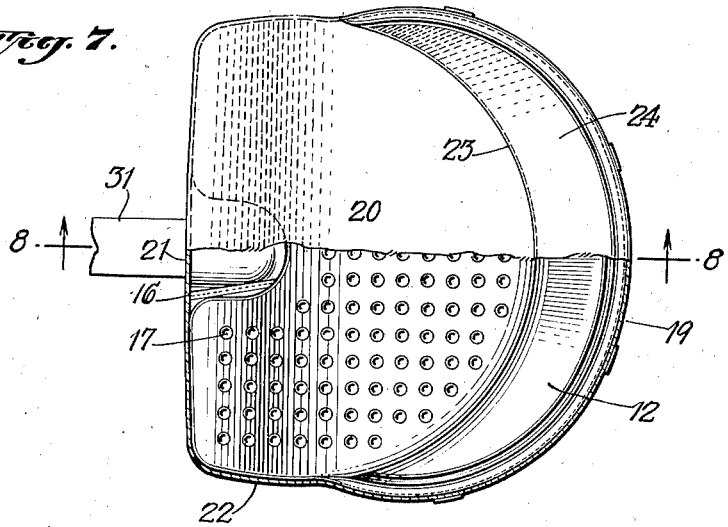
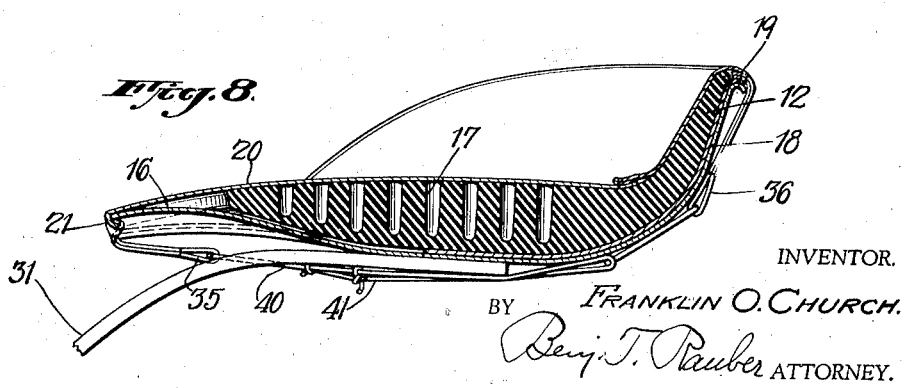

Patented Apr. 8, 1941

2,237,475

UNITED STATES PATENT OFFICE 2,237,475

SEAT CUSHION

Franklin O. Church, Buffalo, N. Y., assignor to Dunlop Tire and Rubber Corporation, Buffalo, N. Y., a corporation of New York Application October 18, 1939, Serial No. 299,957

6 Claims. (Cl. 155—179)

My invention relates to a seat cushion, more particularly to a cushion for seats of stamped metal such as are used on tractors, agricultural equipment, and machines and industrial equipment.

Seats of the above type are commonly formed from a sheet of metal in such a manner as to provide a base plate of semi-circular curvature at the rear and extended at said curved rear part into an upstanding wall to give support at the back and sides to the occupant of the seat, and provided with a hump at the middle of the front edge. Seats of different equipment or of equipment of different manufacture are of different sizes.

My present invention provides a resilient moulded cushion, for seats of the above type, that is easily removable and replaceable on seats of different sizes and that readily conforms to the base and sides of the seat.

In my present invention I provide a seat cushion of a moulded cellular compressible material, such as foamed latex rubber, and having a base supported on the base plate of the seat, and extending upwardly at the rear and sides to fit against the front or inward surface of the upwardly extending walls of the seat. The block of cellular rubber is preferably thicker in the base part, gradually becoming thinner toward the front edge, and the upstanding wall portions are preferably thinner than the base part. It is notched inwardly at its front edge to receive the hump of the seat. The base part of the cellular rubber block may be provided with recesses extending upwardly from its lower surface or downwardly from its upper surface, giving it greater resilience and lightness. The cushion is provided with a cover of any suitable fabric which extends over the upper surface of the base and the front surface of the up-standing walls, and also covers the under side of the resilient block of rubber material. That part of the covering that extends beneath the under surface of the moulded block is formed in two parts, extending inwardly from the side edges to about the median line of the cushion, and with the inner edges biased, overlapping toward the rear of the cushion to cover the back of the cushion, but diverging toward the front to receive the hump of the seat.

Also, in order to tighten the cushion on the seat, the cover is provided with loops extending downwardly from the front, rear and side edges of the top part of the covering in such a manner that a draw string may be passed through these loops and the loops may be drawn tautly downwardly to hold the cushion and its cover in position on the seat. In this way the cushion, which is flexible, may be made to fit seats of different sizes.

The various features of the invention are illustrated for example in the accompanying drawings in which:

Fig. 1 is a plan view of a seat embodying the preferred form of the invention, one half of the cover being torn away to show the rubber cushion block.

Fig. 2 is a bottom plan view of the seat cushion and cover shown in Fig. 1.

Fig. 3 is a bottom view of the moulded block of rubber with the cover removed.

Fig. 4 is a vertical section of the resilient moulded block taken on line 4—4 of Fig. 3.

Fig. 5 is a section of a part of the cushion taken on line 5—5 of Fig. 1.

Figs. 6 and 7 are bottom and top plan views similar to Figs. 2 and 1 respectively, showing the seat cushion mounted on a supporting seat, and Fig. 8 is a vertical section similar to that of Fig. 4, of a cushion and cover mounted on a seat.

In the embodiment of my invention shown in the accompanying drawings the cushion comprises a moulded block of cellular rubber 10, Fig. 4, having a base part 11 which is thicker at an area 13 lying within the semi-circular curved wall 12 and is thinner toward its front areas 14. In the median portion of the front area 14 a bay or recess 15 is provided to receive the hump 16 in Fig. 7, such as is commonly provided in seats of this type. The thicker part 13 of the base may be provided with spaced parallel recesses 17 extending upwardly from its lower surface as in Fig. 4, or downwardly from its upper surface as in Fig. 8 to increase the resiliency of the cushion.

The upper surface of the base part of the cushion is covered by a sheet 20 of any suitable fabric, such as canvas, which is downturned at its front edge 21 and at the front portions of the side edges 22, and which is cut to a semi-circular curvature 23 in the rear part of the seat. Secured to the curved edge 23 is an upstanding extension 24 to cover the front surfaces of the extension 12 and to overlap the upper edge thereof, as shown at 25 in Fig. 5.

Secured to the downturned edges 21 and 22 and to the overlapping part 25 of the extension 24, are a pair of bottom extensions 26 and 27, Fig. 2, arranged symmetrically at opposite sides of the median line of the seat. The inner edges of the extensions 26 and 27 may be inclined as at 28 and 29 respectively so as to overlap toward the rear as at 30 and to spread apart in a gap toward the front of the seat to receive the hump 16 in the bight or notch 15.

In mounting the cushion on a seat 18, it is placed thereon in such a manner that the parts 26 and 27 rest directly on the upper surfaces of the seat with the hump 16 projecting backwardly between the side edges of the parts 26 and 27 and extending into the bight or recess 15. The front portions of the edges of the parts 26 and 27 readily spread, if necessary, to receive a hump of larger size.

To tighten the cushion block against the supporting seat the cover 20 is provided with a number of loops secured to the cover at the edge of the seat and extending beneath the seat itself. These loops may be arranged as shown in Figs. 2 and 6 in a pair 34 and 35 at the front edge, a pair 36 and 37 at the rear edge, and a pair of loops 38 and 39 one for each side of the seat. A draw string 40 may then be passed in succession through each of the loops, and when tightened will draw the seat cushion and cover tightly onto the seat and hold it against any displacement. The draw string, if led into a central loop 41, will act directly between front loops 34 and 35 and the back loops 36 and 37 to draw these loops toward each other. By drawing the edges of the cushion tightly against the walls of the seat, it is caused to fit seats of different sizes and somewhat different shapes, the rubber resilient material being sufficiently flexible to accommodate itself to the various sizes or shapes.

The above invention therefore, provides a seat having a base of the maximum thickness and resiliency where the greatest weight is supported and with adequate cushioning at the sides and back where occasional weights or stresses may be applied. When not in use the cushion may readily be removed, releasing the draw string 40, and may then be transferred to another seat or replaced, as required.

What I claim is:

1. A cushion for seats of the type described which comprises a block of cellular rubber comprising a base and an upstanding wall at the back and sides, a sheet of fabric covering the base and front surfaces of the wall and having a pair of extensions from the front, back and opposite side edges of said sheet beneath said block of porous rubber, said extensions being arranged symmetrically at opposite sides of a median front and back line of said cushion, loops extending from the back, sides and front edges of said sheet below said extension, and a drawstring passing through said loops to draw said loops tightly against the lower surface of the seat.

2. A cushion of claim 1 in which said extensions are in overlapping relation toward the rear and diverge toward the front of said cushion.

3. A cover for molded cushions which comprises a top sheet of fabric having a horizontal area to cover the base of a cushion, and wall areas secured to the side and rear edges of said horizontal area and extending upwardly therefrom, and a pair of under sheets of fabric arranged symmetrically on opposite sides of a median front and rear line of said cover, said under sheets being secured at their front, side and rear edges to the front, side and rear edges of said top sheet, said under sheets overlapping rearward toward the rear of said cover and diverging toward the front edges thereof to form with said top sheet an enclosure for a cushion.

4. A cover for molded cushions which comprises a top sheet of fabric having a horizontal area to cover the base of a cushion, and wall areas secured to the side and rear edges of said horizontal area and extending upwardly therefrom, and a pair of under sheets of fabric arranged symmetrically on opposite sides of a median front and rear line of said cover, said under sheets being secured at their front, side and rear edges to the front, side and rear edges of said top sheet, said under sheets overlapping toward the rear of said cover and diverging toward the front edges thereof to form with said top sheet an enclosure to receive a cushion, and loops extending from the back, side and front edges of said sheets downwardly below said pair of sheets of fabric whereby said cover and the cushion may be secured to a supporting base.

5. A cushion for seats of the type described which comprises a block of cellular rubber comprising a base and an upstanding wall at the back and sides, a sheet of fabric covering the base and front surfaces of the wall and having a pair of extensions from the front, back and opposite side edges of said sheet beneath said block of porous rubber, said extensions being arranged symmetrically at opposite sides of a median front and back line of said cushion and means at the back, sides and front edges of said sheet below said extensions to draw said sheet downwardly onto said block of cellular rubber.

6. A cushion for seats of the type described which comprises a block of cellular rubber comprising a base and an upstanding wall at the back and sides, a sheet of fabric covering the base and front surfaces of the wall and having a pair of extensions from the front, back and opposite side edges of said sheet beneath said block of porous rubber, said extensions being arranged symmetrically at opposite sides of a median front and back line of said cushion.

FRANKLIN O. CHURCH.